(12) United States Patent
Marka et al.

(10) Patent No.: US 8,810,411 B2
(45) Date of Patent: Aug. 19, 2014

(54) OPTICAL BARRIER TO PESTS

(75) Inventors: Szabolcs Marka, New York, NY (US);
Zsuzsanna Marka, New York, NY (US);
Imre Bartos, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 283 days.

(21) Appl. No.: 13/264,518

(22) PCT Filed: Apr. 16, 2010

(86) PCT No.: PCT/US2010/031437
§ 371 (c)(1),
(2), (4) Date: Oct. 14, 2011

(87) PCT Pub. No.: WO2010/151362
PCT Pub. Date: Dec. 29, 2010

(65) Prior Publication Data
US 2012/0032096 A1 Feb. 9, 2012

Related U.S. Application Data

(60) Provisional application No. 61/170,094, filed on Apr. 16, 2009.

(51) Int. Cl.
*E04B 1/72* (2006.01)
(52) U.S. Cl.
USPC .......................... 340/573.2; 52/101
(58) Field of Classification Search
None
See application file for complete search history.

(56) References Cited

U.S. PATENT DOCUMENTS

| | | | |
|---|---|---|---|
| 5,343,652 A | | 9/1994 | Johnson |
| 5,915,949 A | * | 6/1999 | Johnson .......................... 43/124 |
| 6,046,834 A | | 4/2000 | Asada et al. |
| 6,250,255 B1 | | 6/2001 | Lenhardt et al. |
| 6,718,681 B2 | | 4/2004 | Bhullar |
| 6,853,328 B1 | * | 2/2005 | Guice et al. ..................... 342/54 |
| 7,071,829 B2 | | 7/2006 | Gardner, Jr. et al. |
| 7,373,254 B2 | | 5/2008 | Pierce |
| 2005/0226287 A1 | * | 10/2005 | Shah et al. ...................... 372/25 |
| 2006/0233049 A1 | * | 10/2006 | Cilliers ......................... 367/139 |
| 2006/0273172 A1 | * | 12/2006 | Helez et al. .................... 235/439 |
| 2009/0190355 A1 | * | 7/2009 | DeGinto et al. ............... 362/276 |
| 2010/0226122 A1 | * | 9/2010 | Tsai et al. ...................... 362/231 |
| 2010/0229458 A1 | * | 9/2010 | Bowden et al. ................. 43/107 |

OTHER PUBLICATIONS

ISA, "International Search Report and Written Opinion regarding PCT/US2010/031437", Jun. 15, 2010, pp. 4-9, Publisher: WIPO.

* cited by examiner

*Primary Examiner* — Brian Zimmerman
*Assistant Examiner* — Kevin Lau
(74) *Attorney, Agent, or Firm* — Evans & Molinelli PLLC; Eugene J. Molinelli

(57) ABSTRACT

A device generates a light barrier that can be used for different purposes. The barrier consists of one or more surfaces (or volume) exhibiting an abrupt change in light intensity. In some embodiments the change in intensity affects animals, including insects, approaching or crossing it. In some embodiments, the light generates thermal or density variations in the air that cause air movements that perturb particles, such as pollen, or other pests to human activity. In some embodiments, an approach includes an optical barrier generator configured to emit light of an optical waveform above a threshold power in a portion of space positioned relative to the generator. The optical waveform above the threshold power is effective at perturbing a pest to human activity.

38 Claims, 9 Drawing Sheets

200
INDIVIDUAL
REACTION TIME
EXPERIMENTAL SETUP

PEST
TRACK
203

240
REPELLED INDIVIDUAL
EXPERIMENTAL SETUP

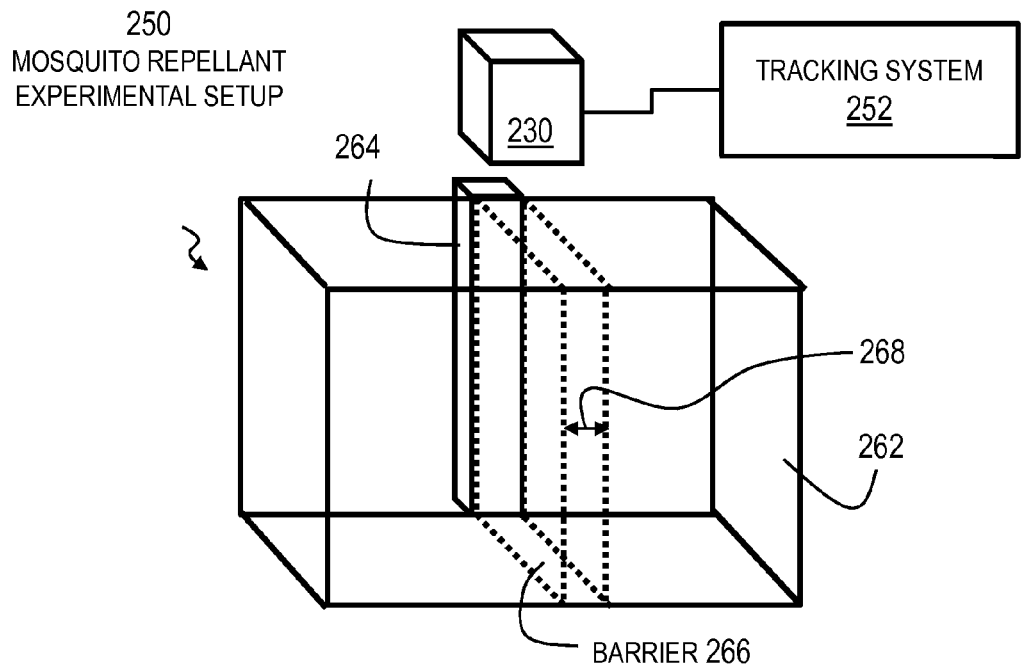
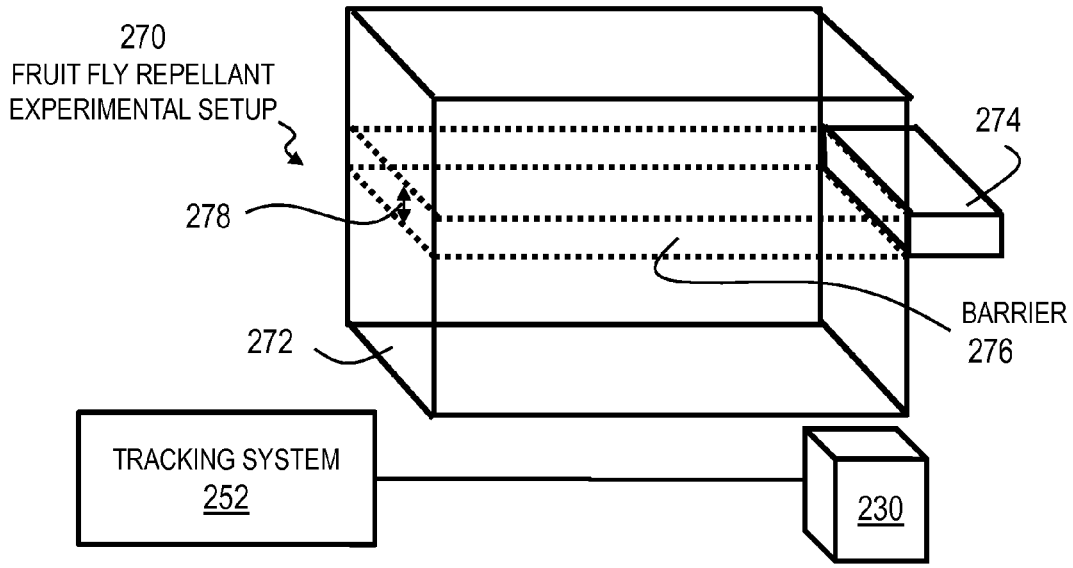

OPTICAL BARRIER TO PESTS

CROSS-REFERENCE TO RELATED APPLICATIONS

This application claims benefit of Provisional Appln. 61/170,094, filed Apr. 16, 2009, under 35 U.S.C. §119(e).

BACKGROUND

Mosquito control is still an unsolved problem in many developing countries. Malaria is epidemic in many places, including sub-Saharan Africa where the majority of the Earth's malaria fatalities occur. Generic control measures rely on toxic chemical and biological agents, while repellents in conjunction with mosquito nets provide additional defense. While these are efficient, they also pose direct danger and serious discomfort to users, albeit small when compared to the grave dangers of malaria. Traditional measures seem to be approaching their peak efficiency in practice, while the malaria epidemic is still ongoing. New, environmentally friendly and complementary approaches of mosquito control are needed to increase our fighting chance against the global spread of the disease.

Some Example Embodiments

A device that generates a light barrier that can be used for different purposes is presented. The barrier consists of one or more surfaces (or volumes) exhibiting an abrupt change in light intensity. In some embodiments the change in intensity affects animals, including insects, approaching, entering or crossing it. In some embodiments, the light generates thermal or density variations that cause air movements that perturb particles, such as pollen, or other pests to human activity. Human activity includes human life, human health and well-being, human movements, human residences, man-made facilities, mines and crops, among other items. As used herein, a pest refers to any large or small living or inanimate object that diminishes human well-being or that is preferred to be redirected for any purposes. Pests include insects and other animals, dust, pollen, viruses, and bacteria among others. As used herein, optical refers to electromagnetic radiation in or near or enclosing the visible band, including ultraviolet and infrared light, and includes wavelengths from about 300 nanometers (nm, 1 nm=$10^{-9}$ meters) to about 350 micrometers (μm, also called microns, 1 μm=$10^{-6}$ meters). The human eye detects electromagnetic radiation in the visible band from about 380 nm to about 750 nm. The ultraviolet (UV) band includes shorter wavelengths than the visible band and the infrared (IR) band includes longer wavelengths than the visible band. As used herein, an optical waveform refers to electromagnetic radiation that includes one or more optical wavelengths mixed in one or more pulses of varying direction, duration and intensity.

In one embodiment, an apparatus includes an optical barrier generator configured to emit light of an optical waveform above a threshold power in a portion of space positioned relative to the generator, wherein the optical waveform above the threshold power is effective at perturbing a pest to human activity.

In another embodiment, a method includes illuminating a portion of space with light of an optical waveform above a threshold power, wherein the optical waveform above the threshold power is effective at perturbing a pest to human activity.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings, in which:

FIG. 2C is a diagram that illustrates an experimental setup, according to still another embodiment;

FIG. 2D is a diagram that illustrates an experimental setup, according to yet another embodiment;

DETAILED DESCRIPTION OF EXAMPLE EMBODIMENTS

Figure 1A:
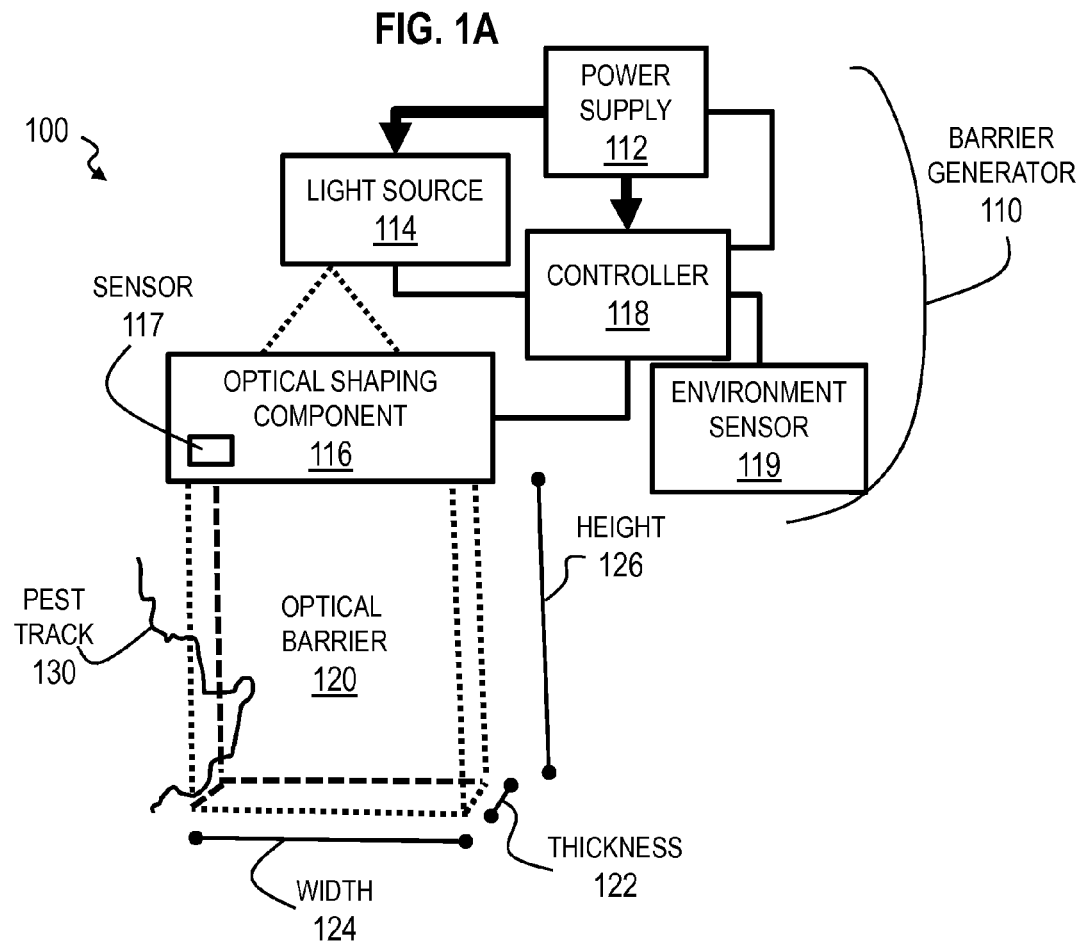
FIG. 1A is a diagram that illustrates a system for generating an optical barrier to pests, according to one embodiment.

A method and apparatus are disclosed for optical barriers against pests. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although several embodiments of the invention are discussed with respect to one or more optical walls to perturb mosquitoes capable of carrying malaria, embodiments of the invention are not limited to this context. It is explicitly anticipated that one or more effective optical barriers can be formed against any particulates subject to optically-induced air movement or heat, or differential light absorption or other phenomena in which the presence of light causes a force to be exerted, or creatures with optical or thermal sensitivity, and can have any shape in space including a wall, sheet, cone, cone surface, sphere, curved surface or any other spatial configuration in the vicinity of one or more light sources. In various embodiments, one or more light sources or one or more optical components or some combination are controlled by a computer or chip to vary the output of an optical barrier generator and include one or more sensors to detect when and how to deploy the barrier. In various embodiments, the effect of the barrier is to direct the pest in specific one or more directions, or to capture the pest in a certain volume, at least temporarily, rather than turning the past back toward the direction from which the pest came. In such embodiments the method is used as guidance to the small living or inanimate objects, rather than as an impenetrable barrier.

In various embodiments, light barrier can affect small animals attempting to approach, enter or cross it. Some embodiments utilize a dorsal light response, that is, the tendency of some insects to move in the opposite direction from the source of light they sense. While many different animals can be affected, illustrated embodiments are directed to arthropods carrying diseases or causing other problems. These arthropods include mosquitoes (malaria, yellow fever, west Nile virus, yellow fever, dengue fever, elephantiasis, filariasis, etc.), flies (Mexican cattle disease), parasitic wasp, agricultural pest, kissing bugs, ants, blackflies (filariasis), ticks (Lyme disease, Typhus fever), sandflies (Leishmaniasis), Tsetse flies (sleeping sickness), assassin/kissing bugs (Chagas disease), lice (Typhus fever), fleas (plague), and spiders, where the parentheses include diseases carried by the specific arthropods. In some embodiments, fruit flies are used as a model for the effects of experimental properties of the optical barriers.

In various embodiments against living organisms, the optical barrier disturbs, damages or eliminates one or more sensors of the sensory system that is used to navigate, locate food sources, or support other functions for a small animal (including insects) that encounters the barrier. Sensors can include antennae, heat sensors (can be on the antennae), compound eyes, ocelli, or other organs responsible for senses. In some embodiments, the optical barrier disturbs, damages or eliminates different body parts of the animal, such as wings or legs for a small animal or insect that encounters the barrier. In some embodiments, the disturbed, damaged or eliminated part changes the behavior of the encountering animal or insect as well as others nearby. In some embodiments, this disables or discourages small animals from entering a given volume defended by the barrier, therefore having a suggested, commanding or guiding effect. In some embodiments, an optical barrier harms or confuses animals so the animals change their behavior upon entering, crossing or approaching the barrier in a way that is beneficial, e.g. mosquitoes lose their ability to locate nearby humans or other food source, do not want to feed on blood or eat for a period of time, or cannot fly for a period of time, or cannot fly efficiently for a period of time, some other effect, alone or in some combination. In such embodiments, 'period of time' can also refer to permanent effects. In some embodiments, the barrier disables or discourages small animals from entering suitable hiding places (e.g., disables mosquitoes from hiding after blood-feeding).

For some embodiments, an effect on large objects, large animals or humans is desired and achieved using the light barrier. For some embodiments, small animals are affected, or some combination of large and small animals. For example, in some embodiments small animals are adversely affected, while humans do not experience adverse effects. In such embodiments, the barrier generator can be designed to have certain desired effect on the targets, e.g. small animals, while having no effect or causing no harm to humans, large animals or large objects. Some specifications of the device that allow this differential effect are discussed below.

FIG. 1A is a diagram that illustrates a system 100 for generating a barrier to pests, according to one embodiment. The proposed system does not contribute to the chemical or biological load on humans and the environment. This new method practiced by this apparatus provides defense in two or more dimensions for a community, in contrast to traditional approaches requiring physical contact between chemical agents and mosquitoes. The illustrated embodiment does not require cumbersome physical barriers; and eliminates pitfalls related to human negligence during daily installation of nets and inadequate coverage of chemical treatments. The protected volume can be easily and permanently sized for children, thus no adults can re-use the children's devices for their own purpose. In some embodiments, the barrier provides visual feedback on the state of protection by default; therefore no expertise is necessary to evaluate the operational status of the equipment. In some embodiments, where infrared or other light not visible to humans is used, an additional light is added to the device that provides visual feedback of correct orientation and operation.

System 100 includes a barrier generator 110 that produces an optical barrier 120 at least intermittently. In the illustrated embodiment, the barrier generator 110 includes a power supply 112, a light source 114, optical shaping component 116, controller 118 and environment sensor 119. In some embodiments, one or more components of generator 110 are omitted, or additional components are added. For example, in some embodiments, the environment sensor 119 is omitted and the generator is operated by controller 118 independently of environmental conditions. In some embodiments, the generator 110 has a simple single configuration and controller 118 is also omitted. In some embodiments, the light source 114 output is suitable for the barrier and the optical shaping component 116 is omitted.

The power supply 112 is any power supply known in the art that can provide sufficient power to light source 114 that the light intensity in the optical barrier is enough to perturb pests, e.g., about one Watts per square centimeter (cm, 1 cm=$10^{-2}$ meters). In an example embodiment, the power supply is an outlet from a municipal power grid with a transformer and rectifier to output a direct current voltage of 2.86 Volts and currents between about one and about 60 Amperes. For example, an Agilent 6671A J08-DC Laboratory Power Supply (0-3V, 0-300 A) manufactured by Agilent Technologies, Inc., 5301 Stevens Creek Blvd., Santa Clara Calif., is used. Any DC power supply providing sufficient voltage, current, and stability to drive the light source is used in other embodiments. In various other embodiments, the power supply is a battery, a solar cell, a hydroelectric generator, a wind driven generator, a geothermal generator, or some other source of local power.

The light source 114 is any source of one or more continuous or pulsed optical wavelengths, such as a laser, lased diode, light emitting diode, lightbulb, flashtube, fluorescent bulbs, incandescent bulbs, sunlight, gas discharge, combustion-based, or electrical arcs. Examples of laser or light emitting diode sources in the infrared region include but are not limited to 808 nm, 1350 nm, 1550 nm emitters. While the light source of the barrier can be any kind of regular light source, laser light sources are expected to be more suitable due to the increased abruptness and controlled dispersion of laser sources (making it easier to focus laser beams towards the desired portion of space). A scanning beam is often easier to accomplish using laser beams. For example, an experimental embodiment of light source 114 is a laser diode emitting a near infrared (NIR) wavelength of 808 nm in a beam with a total power of two Watts. The optical beam produced by this laser experiences dispersion characterized by an angular spread of about +/−10 degrees in one direction and +/−30 degrees in a perpendicular direction.

The optical shaping component 116 includes one or more optical couplers for affecting the location, size, shape, intensity profile, pulse profile, spectral profile or duration of an optical barrier. An optical coupler is any combination of components known in the art that are used to direct and control an optical beam, such as free space, vacuum, lenses, mirrors, beam splitters, wave plates, optical fibers, shutters, apertures, linear and nonlinear optical elements, and any other devices and methods that are used to control light. In some embodiments, the optical shaping component includes one or more controllable devices for changing the frequency, shape, duration or power of an optical beam, such as an acousto-optical modulator (AOM), a Faraday isolator, a Pockels cell, an electro-optical modulator (EOM), a magneto-optic modulator (MOM), an amplifier, a moving mirror/lens, a controlled shape mirror/lens, a shutter, and an iris, among others. For example, an experimental embodiment of the optical shaping component 116 includes an anti-reflection (AR) coated collimating lens (to turn the diverging beam from the laser into a substantively parallel beam) and a shutter to alternately block and pass the parallel beam. Several manufacturers supply such optical components include Thorlabs, of Newton, N.J.; New Focus, of Santa Clara, Calif.; Edmund Optics Inc., of Barrington, N.J.; Anchor Optics of Barrington, N.J.; CVI Melles Griot of Albuquerque, N. Mex.; Newport Corporation of Irvine, Calif., among others. In some embodiments, one or more of these optical elements are operated to cause an optical beam to be swept through a portion of space, such as rotating a multifaceted mirror to cause an optical beam to scan across a surface. In some embodiments, the optical shaping component 116 includes one or more sensors 117 to detect the operational performance of one or more optical couplers or optical devices of the component 116, such as light detector to determine the characteristics of the optical beam traversing the component 116 or portions thereof or a motion detector to determine whether moving parts, if any, are performing properly. Any sensors known in the art may be used, such as a photocell, a bolometer, a thermocouple, temperature sensors, a pyro-electric sensor, a photo-transistor, a photo-resistor, a light emitting diode, a photodiode, a charge coupled device (CCD), a CMOS sensor, or a one or two dimensional array of CCDs or CMOS sensors or temperature sensors. In some embodiments, one or more of the optical components are provided by one or more micro-electrical-mechanical systems (MEMS).

Figure 7:
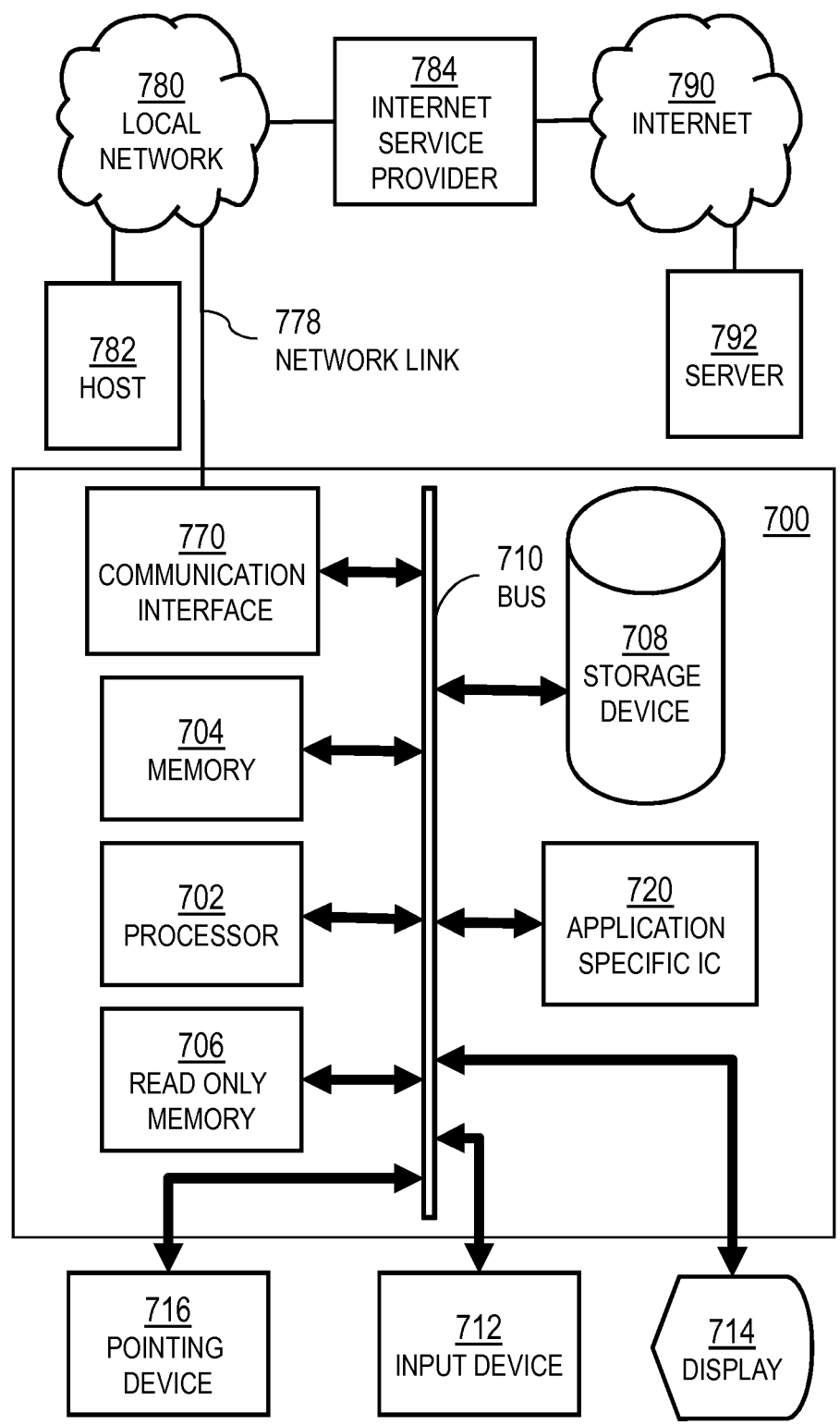
FIG. 7 is a diagram of hardware that can be used to implement an embodiment of the invention.
Figure 8:
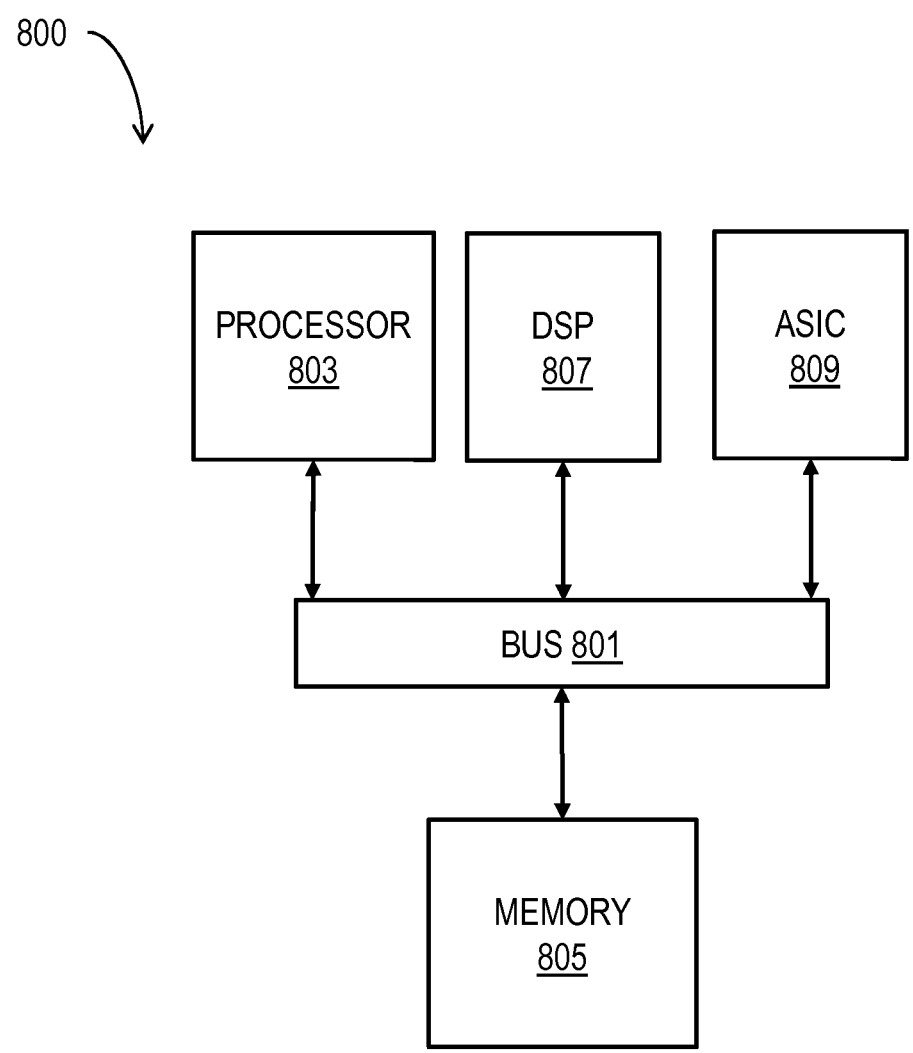
FIG. 8 is a diagram of a chip set that can be used to implement an embodiment of the invention.

The controller 118 controls operation of at least one of the power supply 112 or the light sources 114 or the optical shaping component 116. For example, the controller changes the power output of the power supply 112 to provide additional power when the barrier is to be on, and to conserve power when the barrier is to be off, e.g., according to a preset schedule or external input. In some embodiments, the controller receives data from one or more sensors 117 in the component 116, or environment sensor 119, and adjusts one or more controlling commands to the power supply 112, light source 114 or device of the component 116 in response to the output from the sensors. In some embodiments one or more feedback loops, interlocks, motion sensors, temperature sensors, light sensors are used, alone or in some combination. In some embodiments, the controller can be used to choose between different setups which define controlling schemes between different operation modes based on the input from the sensors or any input from the user. In some embodiments, the controller is used to drive any other devices which are synchronized with the optical barrier generator. Any device known in the art may be used as the controller, such as special purpose hardware like an application specific integrated circuit (ASIC) or a general purpose computer as depicted in FIG. 7 or a programmable chip set as depicted in FIG. 8, all described in more detail in a later section.

The environment sensor 119 detects one or more environmental conditions, such as ambient light for one or more wavelengths or wavelength ranges or in one or more directions, ambient noise for one or more acoustic frequencies or directions, temperature, temperature gradients in one or more directions, humidity, pressure, wind, chemical composition of air, movement of the ground or the environment, vibration, dust, fog, electric charge, magnetic fields or rainfall, among others, alone or in some combination. Any environment sensor known in the art may be used. There are a huge number of sensor vendors, including OMEGA Engineering of Stamford, Conn. In some embodiments, the environment sensor 119 is omitted. In embodiments that include the environment sensor 119, the controller 118 uses data from the environment sensor 119 to control the operation of one or more of the power supply 112, light source 115 or shaping component 116. For example, in some embodiments under conditions of high ambient light, light intensity output by the source 114 or component 116 is increased. As another example, in some embodiments under conditions of near 100% ambient humidity, optical shaping component 116 is adapted to reshape a beam to compensate for increased scattering.

In at least some states (e.g., during a scheduled period or in response to a value output by the environment sensor 119 falling within a predetermined range) the barrier generator 110 produces an optical barrier 120. The optical barrier 120 comprises an optical waveform of sufficient power to perturb a pest and extends in a portion of space related to the generator 110. In some embodiments, the power of the waveform in the portion of space is limited by a maximum power, such as a maximum safe power for the one or more wavelengths of the optical waveform. For example, the illustrated optical barrier occupies a portion of space below the generator. The portion of space can be described as a thin sheet of height 126, width 124 and thickness 122, where thickness 122 represents the narrowest dimension of the barrier 120. Outside the optical barrier 120, the optical waveform, if present, is not sufficiently strong to adequately perturb a pest. In some embodiments, the optical barrier 120 is confined in one or more dimensions by walls or floor of a solid structure, or some combination. In some embodiments, the thin sheet barrier 120 is configured to cover an opening in a wall, such as a door or window.

Effective perturbation of a pest is illustrated in FIG. 1A as causing a pest to travel a pest track 130 that turns back rather than crosses the optical barrier 120. In some embodiments, effective perturbation of a pest includes immobilizing the pest or disabling or killing a living pest. Thus, the optical barrier generator 110 is configured to emit light of an optical waveform above a threshold power in a portion of space 120 positioned relative to the generator 110, wherein the particular optical waveform above the threshold power is effective at perturbing a pest to human activity. Pest perturbation is not observed in normal sunlight, which corresponds to visible light at power density levels below about 30 milliWatts per square centimeter, i.e., less than about 0.03 Watts per square centimeter (W/cm$^2$). Perturbations were always observed at power density levels above about 1 W/cm$^2$.

Figure 1B:
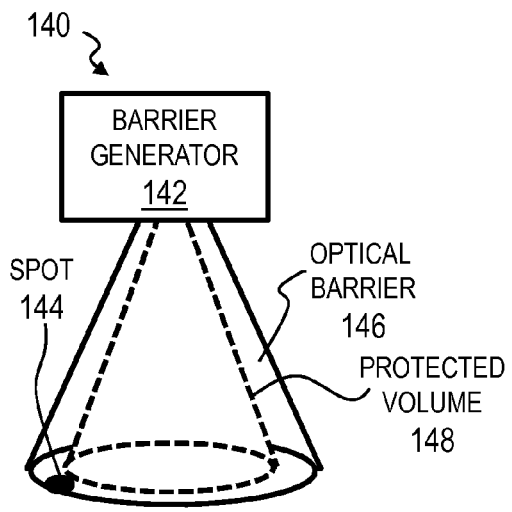
FIG. 1B is a diagram that illustrates an example optical barrier, according to another embodiment.
Figure 1C:
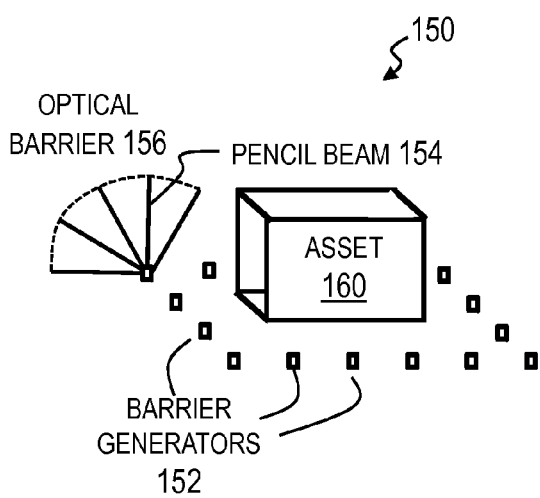
FIG. 1C is a diagram that illustrates an example optical barrier, according to still another embodiment.

In various other embodiments, the optical barrier occupies different portions of space relative to the generator, too numerous to illustrate. However, FIG. 1B and FIG. 1C depict two alternative portions of space to be occupied by optical barriers. FIG. 1B is a diagram that illustrates an example optical barrier 146, according to another embodiment. A hollow conical optical barrier 146 is generated below barrier generator 142 and surrounds conical protected volume 148. In some of these embodiments, the optical barrier 146 is produced by causing a narrow optical beam that produces an individual spot, such as spot 144, to sweep along a circular track on a horizontal surface below the barrier generator. The circular track is desirably circumscribed in a time short compared to the transit time of a pest through the beam that produces the spot 144.

FIG. 1C is a diagram that illustrates an example optical barrier 156, according to still another embodiment. In the illustrated embodiment, multiple barrier generators 152 surround an asset 160, such as a person, or a fixed asset such as a loading dock or pier, or a temporarily fixed asset such as a tent where one or more persons reside. Each barrier generator 152 generates a fan shaped optical barrier 156. In the illustrated embodiment, each optical barrier 156 is a thin fan that covers an obtuse angle of about 120 degrees in one plane and sufficiently thick in a perpendicular plane (not shown) to perturb a pest. The distance of an outer edge of the barrier 156, e.g., an edge farthest from the barrier generator 152, is determined by attenuation or spreading of the light beam forming the barrier 156. In some embodiments, the optical barrier 156 is produced by causing a narrow optical beam, e.g., pencil beam 154, to sweep through the angular range about the barrier generator 152. The sweep is desirably completed in a time short compared to the transit time of a pest through the beam 154. The barrier generators 152 are spaced so that the fan shaped barrier of one generator 152 covers come or all of the space not covered by a fan of an adjacent barrier generator 152 to perturb pests that might otherwise reach asset 160.

The wavelength of the light creating the barrier is important for multiple reasons. The cost of the device creating the light barrier can depend on the wavelength(s) of the light barrier. It is cost effective to select a set of one or more wavelengths that are produced by low cost, mass produced devices, such as light emitting diodes (LEDs). The effect on pests depends on the wavelength(s), e.g. the heat sensors of different animals can be more affected by near infrared (NIR) or infrared (IR) light than by visible light. The absorption, scattering, reflection, refraction, interference and diffraction of light from the light barrier by the eyes of animals or by one or more drops of liquids depend upon wavelength. The combination of different wavelengths can have special effects (e.g., synergistic or conflicting effects) or combined effects on pests. The wavelength also affects safety considerations for humans, or the appropriate animals or other objects not to be harmed in the vicinity of the barrier.

According to the points mentioned above, the light barrier's wavelength(s) is/are determined so that (i) the barrier has sufficient effect on a pest, (ii) the generator is affordable, (iii) the power consumption of the generator is sustainable for a particular purpose, (iv) the lifetime of the generator is sufficiently long to be useful, (v) an abrupt change in light is experienced upon entering the barrier, and, (vi) the barrier is safe for humans if operated in the vicinity of humans. For all these reasons, in an illustrated embodiment a near infrared (NIR) wavelength is used. We should note that the wavelength range above 1400 nanometers (nm, 1 nm=10$^{-9}$ meters) is very useful because the human safety limits are much less restrictive above than below that wavelength. Another promising range used in some embodiments is between about 1500 nm to about 1800 nm, where the human safety limits are the least restrictive.

As described in more detail below, effective optical barriers have been obtained at about 800 nm for experimental embodiments, and one or more wavelengths in a range centered about 800 nm are used in some embodiments. In some of these embodiments, considered more dangerous to human users, the optical waveform includes a continuous or pulsing beam in the visible range, e.g., red (about 700 nm) to warn the human users of the presence of a possibly dangerous optical barrier. In some respects, the performance of near infrared (NIR) wavelengths, where safety limits are more relaxed, is forecast by experiments performed with cost effective, shorter NIR wavelengths, where the safety limits are tighter. In various embodiments, the performance of safe near infrared (NIR) wavelengths is forecast by experiments performed with other cost effective IR or visible wavelengths.

In an illustrated embodiment, the optical barrier is used in order to make it harder for arthropods to enter a given volume and potentially attack or feed on humans (or other animals or food products) inside, while keeping the device safe for use, e.g., safe for humans or other large animals to cross or enter the barrier and suffer no substantial negative effect. It is an advantage to use optical (e.g., visible, far infrared, FIR, NIR or IR) wavelengths for this purpose, especially the IR wavelength band. Many blood feeding animals, e.g. mosquitoes, detect humans using a combination of different sensors, including heat sensors and their eyes. FIR, NIR or IR affects heat sensors directly, while such wavelengths can also heat up the bodies of the usually dark-skinned animals with such sensors. For humans, the part of the body to be protected which is most sensitive to light is the eye. Visible light is focused onto the retina, and therefore collected on a small surface. Light with larger wavelength behaves differently: it does not get focused on the retina, but somewhere closer to the surface of the eye, e.g. on the cornea. If the focal length is too small, the light is collected on a thin surface layer to which it can be harmful. A more desirable scenario is when the light gets absorbed by the bulk of the eye; therefore the optical beam's heat is spread over a larger volume, having much less effect than in other cases where the beam's energy is focused or collects on a surface. The NIR wavelengths are expected to be more useful that ultraviolet or purely visible light for the application of defending humans from arthropods. Mosquito eyes are also expected to sense at least some IR wavelengths, even though human eyes do not detect such wavelengths.

Light absorption in materials depends upon wavelength. Visible light does not get absorbed in the cornea or lens, and therefore it can reach the retina in both human and mosquito eyes (where the retina consists of only a few retinula cells). IR light gets absorbed quicker. For certain wavelength ranges, this absorption is really quick and the surface layers of the eye absorb all the light, therefore strong illumination can burn the eye's surface. For human eye, there is optimal peculiar wavelength band centered about 1550 nm. This advantageous wavelength range is also reflected in the international laser safety standards, where this wavelength interval has much higher threshold than other wavelengths. Being much smaller than the human eye, the above mentioned wavelength penetrates the mosquito eye and reaches the retinula cells; therefore the mosquito's eye's sensitivity is expected to be greater than the sensitivity of the human eye in the NIR band around 1550 nm.

In some embodiments, the barrier helps to mitigate various vector borne diseases, such as malaria, in the established and developing world. The barrier generator provides such mitigation without directly damaging the environment with chemicals or biological agents. The barrier generator is difficult to misuse or hijack for other purposes, such as using mosquito nets for fishing in developing countries. In some embodiments, the barrier generator also provides a solution in developed countries, e.g., by being mounted above beds or in windows or doorways to keep mosquitoes or other insects away from humans or mounting barrier generators to protect entrances to transportation equipment such as planes, ships, trains, among others, which are capable of carrying pests to other geographic areas, potentially far away from their original habitat.

For determining the power range of the optical barrier, one needs to consider the aspects described for choosing the wavelength of the barrier. The effect on different animals, the cost, the effect on humans, etc. also largely depends on the power range. An effective power level can be determined through routine experimentation. In the experiments described in more detail below power level of about four Watts/cm$^2$ is effective at perturbing the behavior of both mosquitoes and fruit flies and likely other insects. In general, a power range from more than about one up to less than many Watts/cm$^2$ is considered effective and made safe.

In various embodiments, the barrier is generated to have different shapes, depending on the application. It can be an optical slab, or wall, with cone, plane, disk, pyramid, or other, arbitrary shapes, as shown in FIG. 1B and FIG. 1C, above. The barrier can cover an area, a dwelling, a warehouse, a plaza, a road, a pier, bodies of water, etc. For the application of keeping arthropods away from humans, in various embodiments, one or more barriers are placed in windows, below the ceiling/roof, over the bed, in doors, on the ceiling, over a table or chair, over a house or tent, at other openings of houses, buildings, bunkers, fortified locations, at the windows, doors or other openings of transportation vehicles (aircrafts, cars, trucks, ships, boats, trains, among others), or a person can carry the barrier generator, alone or in some combination.

In various embodiments, the barrier is made of light with various temporal properties. In various embodiments, the light is quasi continuous, continuous or pulsed, or some combination. Besides having the barrier turned on or off as a whole, such as in a stationary wall, one can use alternative embodiments, e.g. a scanning beam that scans through the barrier in some function of time. For example if a laser beam scans through a plane with high enough scan frequency, an arthropod attempting to cross the barrier will be illuminated by the light independently of its path or velocity. In some application, this solution is preferable over a stationary barrier, e.g. if a short but intense illumination has more effect than a longer but less intense one. Thus a waveform includes stationary or scanning light of one or more wavelengths of varying intensity, duration and direction.

In some embodiments, light is also targeted using some feedback based on the surrounding environment of the barrier generator. For example, the barrier turns on only when some motion (or other) sensors detect an arthropod attempting to cross the barrier. In some embodiments the time when the barrier is on is restricted to when a human enters the protected volume, or to dusk and dawn when some blood feeding arthropods are the most active. Some of these embodiments significantly decrease power consumption or differentiate between different animals and different types of crossings.

In some embodiments, the optical barrier is used to differentially affect animals with different properties or characteristics. For example, the optical barrier is used to differentially affect animals: large vs. small, light vs. dark, fast vs. slow, charged vs. neutral, sharp vs. smooth, different materials, different densities, different directions of motion, different sensitivities, night vs. dark adapted, female vs. male, old vs. young, among others.

Experimental Embodiments

Experiments were performed to determine effects of example optical barriers on mosquitoes and fruit flies. To elucidate the mechanism of insect response to the optical barrier, additional experiments were performed on fruit flies bred to eliminate various sensory systems. To provide a source of specimens for the experiments, an insectary was established in a bio-safety level 1 laboratory space that has separate air conditioning and HEPA standard air cleaning system. Additionally, the laboratory space is equipped for Class 4 laser safety features. The insectary is used to provide specimens of the mosquito *Anopheles gambiae* that serves as a vector for the malaria parasite.

A large, double walled humidity and temperature controlled enclosure measuring approximately 0.7×0.8×2 m houses the *Anopheles gambiae* insectary. Other enclosures with significantly different sizes are also possible. The operation of this insectary is based on the operation of visited insectaries including one at Center for Disease Control (CDC) in Atlanta Ga. *Anopheles gambiae* eggs (G3, depositor Mark Benedict) were obtained from MR4 (see World Wide Web domain mr4 of type org), establishing a general use wild type colony. The insectary has been maintained through several generations of *Anopheles gambiae* mosquitoes. The insectary provides a stable stock that is self sustaining as well as a harvestable number of mosquitoes for the experiments.

Standard mosquito rearing techniques are used as described in *Methods in Anopheles Research* a manual by Mark Benedict et al. (available at World Wide Web domain mr4 of type org in directory Portals/3/). The mosquitoes are blood fed using heparinized animal blood ordered from Hemostat Laboratories of Dixon, Calif. PARAFILM™ a product of the Pechiney Plastic Packaging Company, based in Chicago, Ill. is used as artificial skin. A blood warming technique was devised utilizing heat patch pockets available in pharmacies for the treatment of neck and back aches. While being extremely low cost, the method also significantly decreases the complexity and labor involved in blood feeding in an insectary.

Figure 2A:
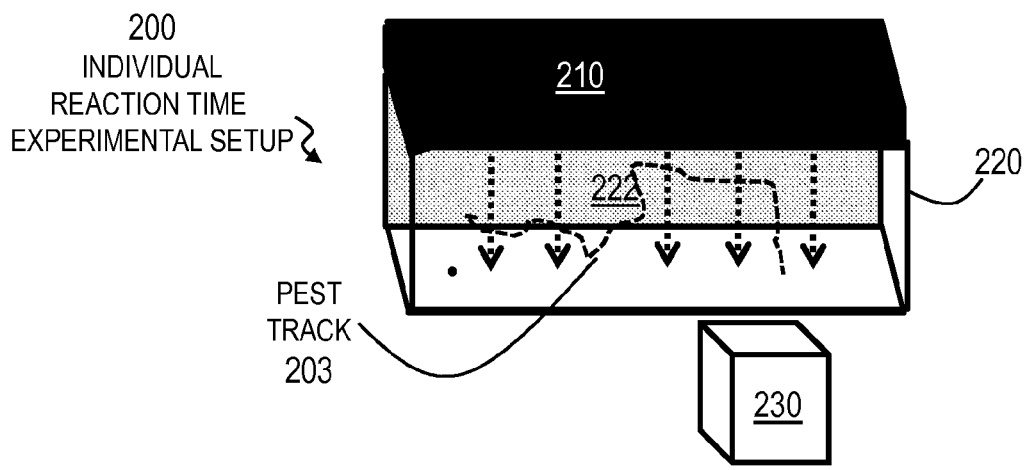
FIG. 2A is a diagram that illustrates an experimental setup, according to one embodiment.

FIG. 2A is a diagram of an experimental setup 200, according to one embodiment. Experimental setup 200 is used to determine the reaction time of an individual mosquito. The experimental setup 200 includes a box 220 with transparent top portion and a transparent front portion, both made of optical glass. The box has dimensions of about 1.19 cm×0.47 cm×5.5 cm for width, thickness and height, respectively. The rear wall 222 was made of a dense mosquito net that a mosquito specimen could stay on.

The experimental setup 200 includes a switchable optical barrier generator 210 disposed above the box 220 for generating an optical barrier (dotted arrows) that fills the box and substantively homogeneously irradiates the volume from above. The generator 210 is switchable because the optical barrier can be turned on or off. The generator 210 includes a 2 Watt 808 nm wavelength laser, anti-reflection (AR) coated collimating lenses and a shutter that is closed to turn off the optical barrier. The light from the 2 W laser diode with about 10 degrees×30 degrees divergence was passed through the lens that created a light wall of parallel light with 1.19 cm×0.47 cm cross section. The light in the wall was pointed downward. When the shutter is open, the optical barrier is on and the power level inside the volume is about four Watts/cm$^2$. In other embodiments, the generator 210 includes other lasers, such as 975 nm, 1210 nm, 1550 nm among others, such as, SDL-6360-C by JDS Uniphase Corporation of Milpitas, Calif. and LDX-3210-1210-C and LDX-3210-1550-C by LDX Optronics of Maryville, Tenn. The laser drivers, thermoelectric coolers and cabling are models 242 (laser mount), 5305 (TEC controller), and 4320 (laser controller) by Arroyo Instruments of Grover Beach, Calif. The optical and mechanical components are from major vendors such as Thorlabs of Newton, N.J., and Edmund Optics Inc. of Barrington, N.J.

The experimental setup 200 includes a high speed video camera 230 directed to the transparent front wall of box 220 to record the response of a pest inside the volume to turning on the optical barrier. The high speed camera 230 used was an Exilim EX-F1 made by CASIO of Tokyo, Japan.

The experimental setup 200 was used to test mosquitoes' reaction times to illumination. An individual *Anopheles gambiae* mosquito was enclosed in the box 220. Tests were done in different lighting conditions, for example with and without back light, with and without general room light, and others. The enclosed mosquito calmed down after its placement into the box; the optical barrier was switched on; and, the reaction of the mosquito was recorded. This allowed the determination of an initial reaction time, a lethal dose and a damage threshold.

One result is that a mosquito that is exposed to the optical barrier (808 nm, 4 W/cm$^2$) produced by generator 210 is perturbed to fall to the bottom of the box 220 within about one second. Such a result is illustrated schematically by pest track 203 that shows a pest entering the box and falling to the bottom of the box when the shutter is opened and the box is suddenly filled by the optical barrier.

Another result is that a mosquito appears to first react to the 808 nm optical barrier by beginning the movement toward the bottom within about 100 milliseconds (ms, 1 ms=10$^{-3}$ seconds) of turning on the barrier. Another result is that a mosquito appears to first react to a 1550 nm optical barrier by beginning the movement toward the bottom within about 2 seconds (2000 ms) of turning on the barrier. The difference in reaction times implies the reaction depends on different sensory systems in the insect. The longer reaction time at 1550 nm allows for significantly longer irradiation times or allows for using 1550 nm synchronized with one or more other optical wavelengths. This in turn potentially allows higher doses to be delivered before the mosquito senses that it is being illuminated or heated.

Another result is that, after about 1 second of illumination by 808 nm at a higher power level, about 8 W/cm$^2$, the mosquito survived for at least a few tens of seconds. When subsequently illuminated for another 2 seconds at the higher power level, the mosquito died.

Figure 2B:
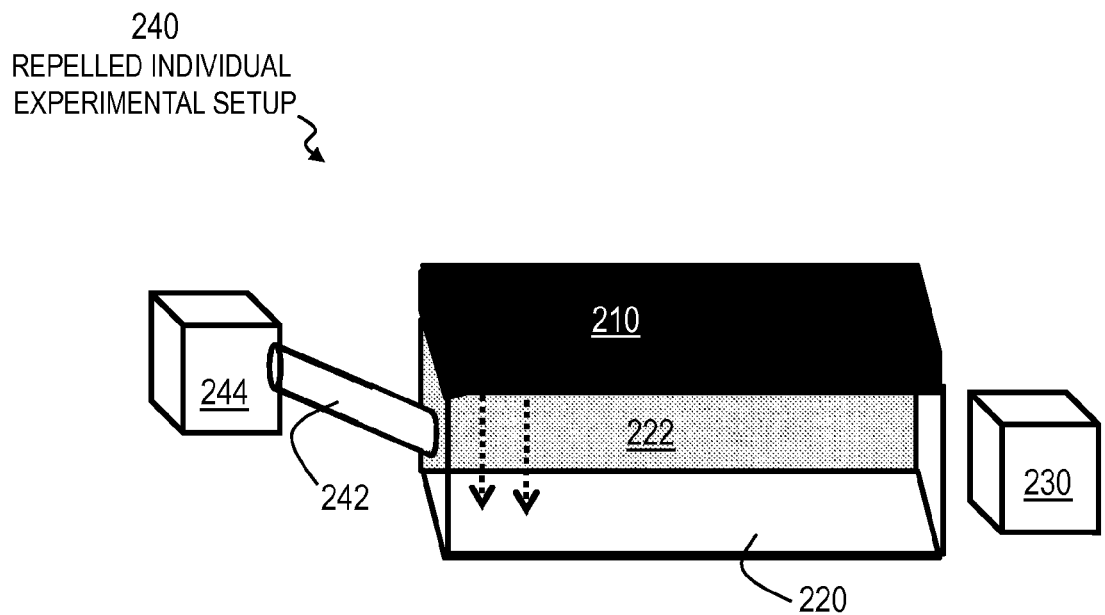
FIG. 2B is a diagram that illustrates an experimental setup, according to another embodiment.

FIG. 2B is a diagram of an experimental setup 240, according to one embodiment. Experimental setup 240 is used to determine whether an individual mosquito is repelled by an optical barrier. The experimental setup 240 includes the box 220 and generator 210 of FIG. 2A. A black plastic tube 242 with an inner diameter just under one centimeter was placed in about a 60 degree incline, with its end cut vertically abutting the box 220. The light barrier was placed close to the end of the tube (there was a gap of a few millimeters between the opening and the light barrier). From the insectary cage a mosquito was transferred into a small cage 244. The black tube 242 connected the cage 244 to the edge of the box 220 containing the optical barrier. The mosquito was allowed to move freely within the cage-tube system. A camera 230 that faced the exit of the tube was placed looking through the light barrier. The room was illuminated with normal ambient light and not darkened.

Figure 3:
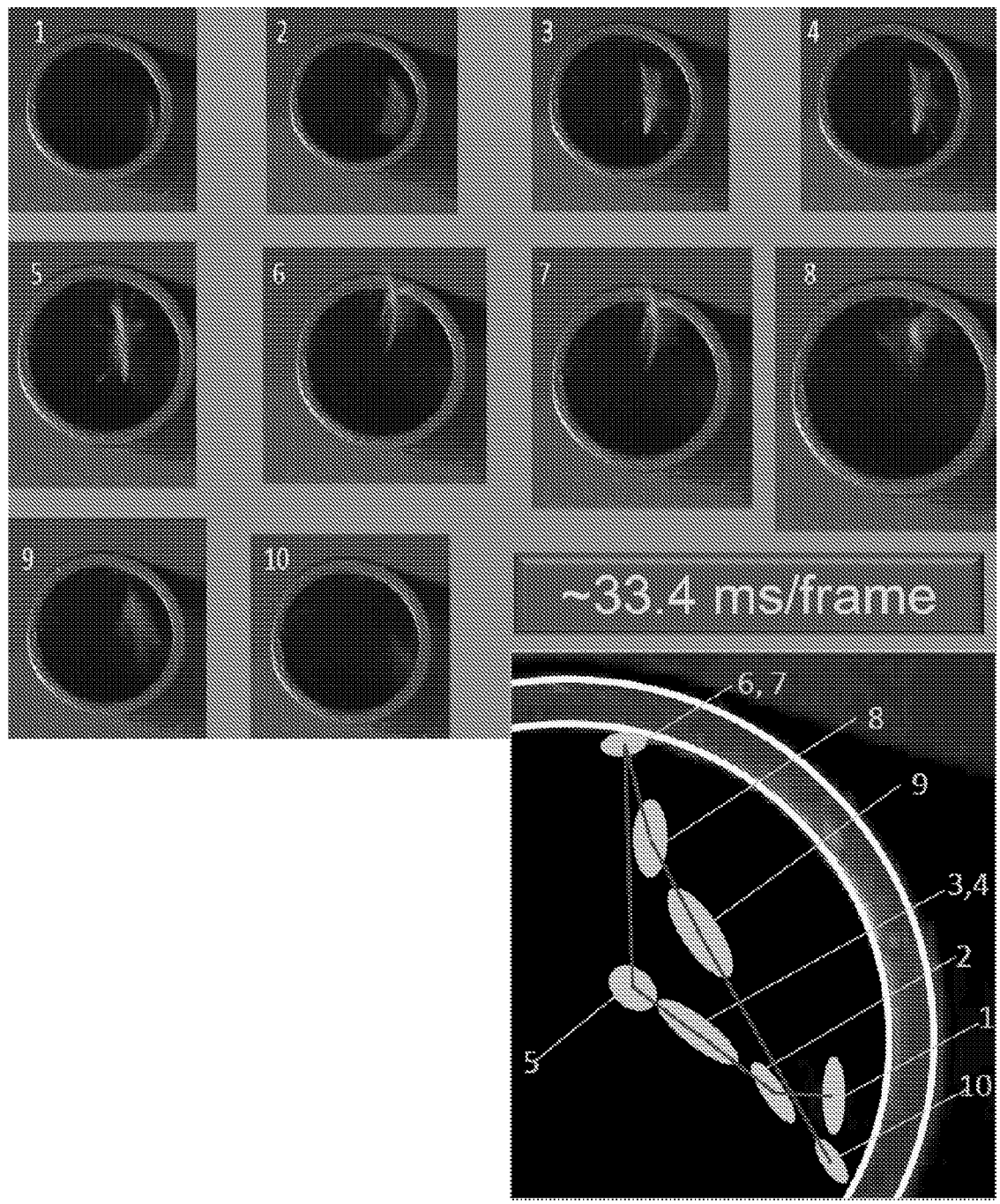
FIG. 3 is a composite of images that illustrates an experimental effect of an optical barrier on a mosquito using the experimental setup of FIG. 2B, according to an embodiment.

After a few minutes, the mosquito exited from the cage 244 and flew into the tube 242. Reaching the end of the tube 242, the mosquito began to exit the tube and reached the edge of the optical barrier. The mosquito suddenly turned back. The camera 230 captured images of the mosquito approaching the exit and then immediately flying backwards into the tube 242. Several frames from camera 230 capturing this behavior are reproduced in FIG. 3. FIG. 3 is a composite of images that illustrates an experimental effect of an optical barrier on a mosquito using the experimental setup of FIG. 2B, according to an embodiment. Ten images representing frames taken about 33.4 ms apart are reproduced. In frame 1 a portion of an individual mosquito is evident inside the tube 242 and more of the individual mosquito becomes evident until the entire mosquito is seen in frame 5. Frames 6 and 7 show the mosquito attempting to exit the tube 242. Frames 8 and 9 show the mosquito retreating back into the tube 242. In frame 10 the mosquito is no longer evident. The ten positions evident in frames 1 through 10 are mapped to a single diagram as insert to lower left of FIG. 3, and connected in time sequence to indicate the observed mosquito track. This sequence of images is evidence that the optical barrier produced by generator 210 repels mosquitoes.

About 70 seconds later, the mosquito approached the exit again, but this time, after reaching the exit, it hugged around the lip of the tube and then immediately started flying upward sharply so it avoided flying into the optical barrier.

FIG. 2C is a diagram that illustrates an experimental setup 250, according to still another embodiment. Experimental setup 250 is used to determine whether a swarm of *Anopheles gambiae* mosquitoes from the insectary are kept from crossing an optical barrier. Given the reaction time (100 ms) for such a mosquito to a 808 nm optical barrier, and given the fastest travel speeds of such mosquitoes, the optical barrier should be on the order of two centimeters (2 cm) thick.

The experimental setup 250 includes a box 262 and an optical barrier generator 264. The box 262 includes optical quality Plexiglas sides and bottom and an optical quality glass top wall; and has dimensions of about 22 cm width by about 40 cm length by about 6 cm high, depicted along the back of the box 262 in FIG. 2C. The optical barrier generator 264 is disposed midway along the transparent wall and projects an optical barrier 266 horizontally into the box. The optical barrier includes a 808 nm wavelength waveform, fills a vertical cross section of the box and has a thickness 268 of about 2.5 cm. The barrier 266 divides the box into a left chamber and a right chamber into which mosquitoes are introduced. The tracts of the mosquitoes are filmed using high speed video camera 230 viewing the interior of the box 262 through the transparent top. A tracking system 252 automatically identifies an individual mosquito in successive frames and constructs a track of each mosquito in the box 262. Tests were done in different lighting conditions, for example with and without back light, with and without general room light, and others.

*Anopheles gambiae* mosquitoes entered the chamber from one side (either the left or the right in various experiments). The reaction of the mosquitoes upon encountering the light barrier 266 were observed and recorded by the video camera 230 viewing the box from above the optical wall-shaped barrier 266. The box 262 was kept in a room of 78° F. that is optimal for *Anopheles gambiae*. The motions of the mosquitoes were recorded using a camera placed above the box 262 and facing downward. The data obtained were analyzed using tracking software that had been developed for this purpose in the tracking system 252. The dynamic image processing software identifies the mosquitoes in the box and follows each mosquito's motion frame by frame to form a track for each mosquito and archives a track for each. The recorded tracks allow the recovery of graphical and statistical results, such as the position, velocity, and acceleration history of the flying mosquitoes.

Figure 4:
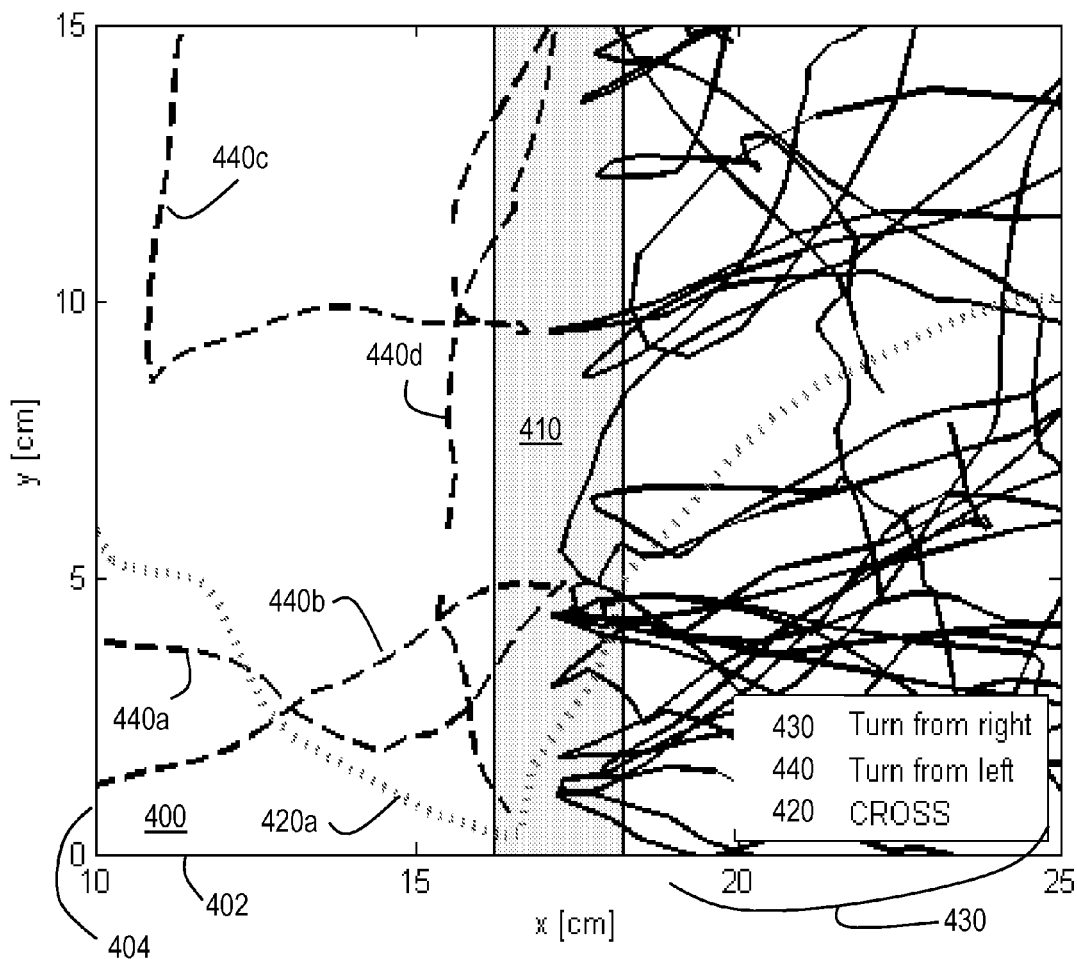
FIG. 4 is a graph that illustrates an experimental effect of an optical barrier on a mosquito using the experimental setup of FIG. 2C, according to another embodiment.
Figure 5:
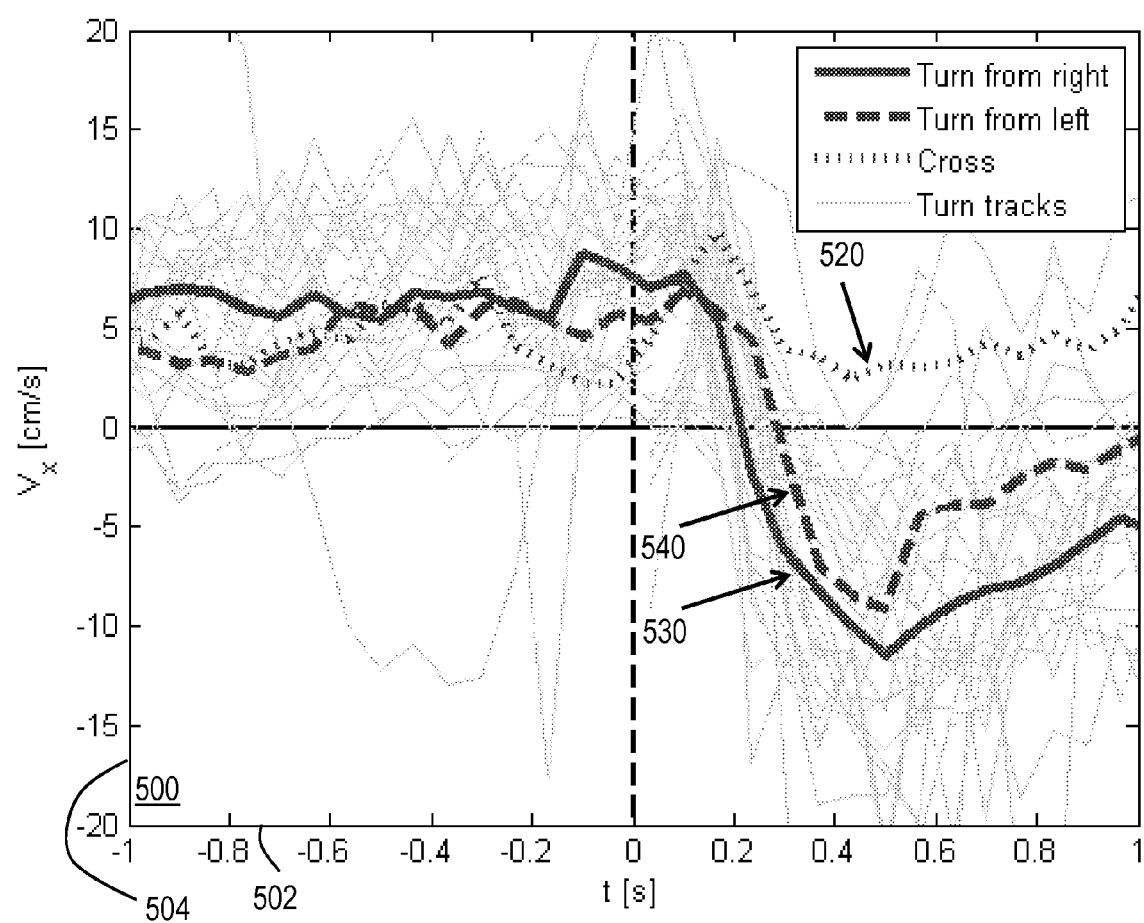
FIG. 5 is a graph that illustrates velocity profiles of multiple mosquitoes using the experimental setup of FIG. 2C, according to an embodiment.

FIG. 4 is a graph 400 that illustrates an experimental effect of an optical barrier on a mosquito using the experimental setup of FIG. 2C, according to another embodiment. Graph 400 shows how most mosquitoes are turned back by the optical wall barrier 266 by plotting the tracks flown by several representative individual mosquitoes, as viewed from above. The horizontal axis 402 indicates distance (in centimeters) along the box perpendicular to the optical barrier 266. The vertical axis 404 indicates distance (in centimeters) along the box parallel to the optical barrier 266. The position of the optical barrier 266 is indicated by the vertical band 410 that is 2.5 cm thick. Tracks in which the mosquito entered the barrier from the right chamber but turned back are shown as solid line tracks 430. Tracks in which the mosquito entered the barrier from the left chamber but turned back are shown as dashed lines tracks 440a, 440b, 440c (collectively referenced hereinafter as tracks 440). Tracks of mosquitoes which cross the laser wall are shown as dotted line track 420. A large majority of mosquitoes were turned back when encountering the light barrier. Some of the few mosquitoes that crossed the barrier did so by attempting to fly in the opposite direction of the illumination. This can be partially or fully due to so-called dorsal light response, or the fact that they are trying to fly away from the illumination that is considered dangerous. Such a pattern in the behavior of crossing mosquitoes is used to further optimize the method in some embodiments, FIG. 5 is a graph that illustrates velocity profiles of multiple mosquitoes using the experimental setup of FIG. 2C, according to another embodiment. Graph 500 shows how most mosquitoes start to reverse direction within about 100 ms of encountering the optical wall barrier 266 by plotting the velocity of flight versus time. The horizontal axis 502 indicates time (in seconds, s) relative to a time (0 seconds) when the track encounters the optical barrier 266. The vertical axis 504 indicates velocity of flight (in centimeters per second, cm/s). A positive velocity has a component that is initially toward the optical barrier, i.e., a velocity component to the right for mosquitoes approaching the barrier 266 from the left half of the box 262, or toward the left for mosquitoes approaching the barrier 266 from the right half of the box 262. Individual velocity profiles 510 are shown in gray. Velocity profile 520 is an average of velocity profiles for tracks that cross through the barrier 266, such as track 420 depicted in FIG. 4. Velocity profile 530 is an average of velocity profiles for tracks that approach from the right half of box 262 but turn back, such as tracks 430 depicted in FIG. 4. Velocity profile 540 is an average of velocity profiles for tracks that approach from the left half of box 262 but turn back, such as tracks 440 depicted in FIG. 4. In profiles 530 and 540, the velocity starts to decrease about 0.1 seconds (100 ms) after encountering the barrier and completely reverses direction about 0.25 seconds (250 ms) after encountering the optical barrier. Acceleration is constant for about 250 ms during which times mosquitoes accelerate to a velocity while retreating that is higher than their original velocity upon entering. One can also see that mosquitoes that eventually cross the barrier fly through the wall with about the same speed as their entering velocity.

For a barrier comprised primarily of 1550 nm wavelength light, for which the mosquito has a much slower reaction time of 2000 ms (rather than 100 ms at 808 nm) an effective barrier is expected to be about 20 times thicker than an 808 nm barrier, i.e., about forty (40) cm thick rather than about 2 cm thick for a waveform of 808 nm wavelength.

To determine the generality of such results when applied to other pests, such as other insects, experiments were conducted with flies. These experiments (not shown) proved that other flying insects, such as various species of flies, are susceptible to being repelled by optical barriers, with responses similar to the above described responses of mosquitoes. Experiments were conducted with four species of flies—three common local varieties with different body size, and the fruit fly, *Drosophila melanogaster*. All species clearly displayed the aversion to cross the optical barrier. [Most tests were performed with 808 nm wavelength light and a barrier thickness of about 0.5 cm.

Fruit flies (*Drosophila melanogaster*) were selected for experiments to determine mechanisms of insect reaction to optical barriers because the genome is well known and can be manipulated readily to disable one or more sensory systems, thus providing a mechanism to elucidate the insect sensory systems involved in reacting to the near infrared (NIR) barriers applied to mosquitoes, as described above. The large number of genetically modified strains and the available genetic tools for *Drosophila melanogaster* allows mechanism questions and cross species similarities in behavior to be addressed. Considering the large degree of homology (>70%) between the genomes of *Drosophila melanogaster* and *Anopheles gambiae*, results obtained from the *Drosophila melanogaster* experiments will also allow insight into the possible sensory path leading to the repelled behavior of the mosquito, therefore accelerating the determination of optimal optical waveforms under varying environmental conditions. Specifically, due to the availability of genetically modified fruit-flies that lack certain sensors, experiments have been performed to measure how much the absence of a given sensor changes the behavior of fruit flies that encounter an optical barrier.

Such results are also applicable to other insects, besides mosquitoes, with one or more similar sensory systems, such as heat sensors for seeking human and other warm blooded targets. There are many disease vector insects worldwide other than mosquitoes and flies, such as kissing bugs, ticks, etc. These threats could also be mitigated using optical barriers, as they often rely on such heat seeking sensors to locate their human or animal prey. Experiments with flies, wasps and mosquitoes indicate that other insects can also be deluded, repelled, disabled or killed by optical barriers. For example, one exploratory experiment was performed with a wasp and an optical beam of about 1 W/cm2 of 1064 nm wavelength light. The experimenters observed that the insect lost its ability forever to fly after the illumination.

Fruit flies have a natural tendency to crawl upwards against the pull of gravity (called negative geotactic behavior); so to increase probability of interaction with an optical barrier, a horizontal barrier is generated. FIG. 2D is a diagram that illustrates an experimental setup 270, according to yet another embodiment. Experimental setup 270 is used to determine whether a swarm of fruit flies are kept from crossing an optical barrier and whether such crossings are dependent on particular insect sensory systems.

Figure 6:
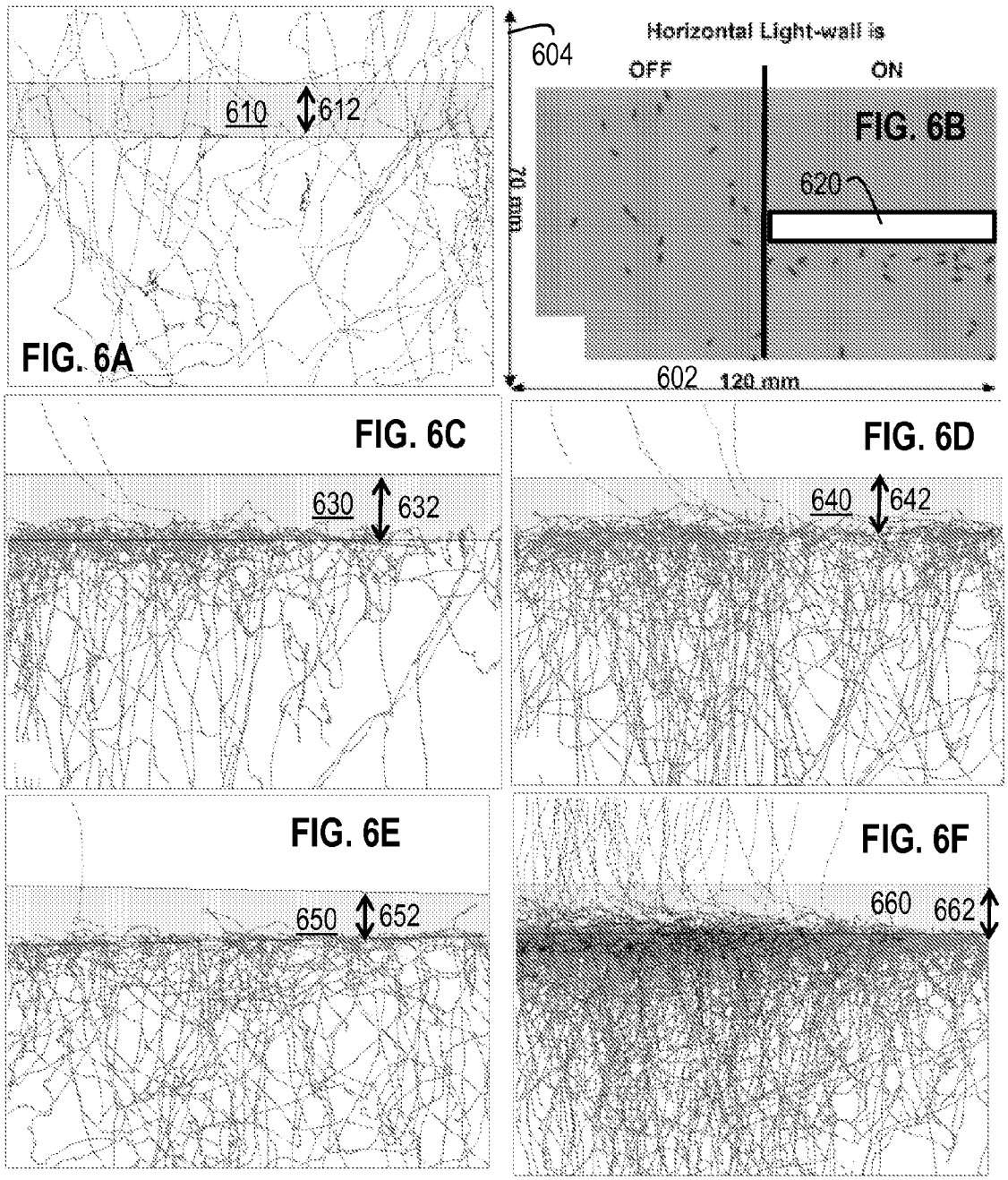
FIG. 6A through FIG. 6F are graphs that illustrate an experimental effect of an optical barrier using the experimental setup of FIG. 2D on multiple groups of fruit flies with different sensory systems in each group, according to another embodiment.

The experimental setup 270 includes a box 272 and an optical barrier generator 274. The box 272 is 20.3 cm high by 12.7 cm long by 1 cm wide and is composed of optical quality Plexiglas walls and 2 optical quality glass covered openings at the middle of the sides. The side opening are about 2.5 cm high by about 1 cm wide; and allow light to enter and exit the box, depicted along the right side and front of the box 272 in FIG. 2D. The high speed camera 230 usually recorded approximately the entire length of the box and the relevant region below and above the optical barrier. In FIG. 6, the horizontal dimension 602 depicts only a fraction of the chamber around the optical barrier to provide a resolved image of the insect bodies. The optical barrier generator 274 is disposed midway along the right vertical wall and projects an optical barrier 276 horizontally into the box 272. The optical barrier 276 includes a 808 nm wavelength waveform, fills a horizontal cross section of the box and has a thickness 278 of about 0.5 cm. The barrier 276 divides the box 274 into an upper chamber and a lower chamber into which fruit flies are introduced. The tracks of the fruit flies are filmed using high speed video camera 230 viewing the interior of the box 272 through the transparent front wall. The tracking system 252 automatically identifies an individual fruit fly in successive frames and constructs a track of each fruit fly in the box 272. Tests were done in different lighting conditions, for example with and without back light, with and without general room light, and others.

Tracing large numbers of fruit flies provided good statistics for *Drosophilae melanogaster* behavior in the vicinity of the optical barrier 276. Numerous experiments were conducted for different types of flies, including wild as well as genetically modified fruit flies for which different components of the sensory system were disabled. Modified flies were used in the experiments to allow insight into the role of individual components of the sensory system. The types of fruit fly genotypes that were subjected to experimentation to date included various wild types (e.g. Oregon R, yellow white), and genetically modified versions in which the high/mild heat sensors or parts of the visual system are disabled. Using these different genotypes, important information was extracted on the role of particular senses in the detection of the optical barrier.

FIG. 6A through FIG. 6F are graphs that illustrate an experimental effect of an optical barrier using the experimental setup of FIG. 2D on multiple groups of fruit flies with different sensory systems in each group, according to another embodiment. Each of the graphs shows a view of the front of the box with a horizontal and a vertical dimension. The horizontal axis 602 represents distance in the horizontal dimension along the front of box 272; and the vertical axis 604 represents distance in the vertical dimension along the front of box 272.

FIG. 6A is a graph that depicts typical movement pattern tracks of *Drosophilae melanogaster* with no optical barrier in place. For comparison purposes the position of the optical barrier 610 when present, with thickness 612 of about 0.5 cm, is also shown. As expected, flies tended to climb towards the ceiling of the chamber. The fly tracks also covered the vertical cross section of the chamber approximately uniformly in the absence of a light wall.

FIG. 6B is a graph that depicts a comparison of distributions of *Drosophilae melanogaster* for the case of no light wall (left) and in the presence of a light wall 620 (right). Without the light wall, flies tend to walk to the top of the chamber. With the light wall 620 on, nearly all flies stay below the light wall 620, attempting to cross it many times but always turning back in the illustrated data.

In FIG. 6C, FIG. 6D, FIG. 6E and FIG. 6F an optical barrier 630, 640, 650 and 660, respectively, is on. The barriers have thicknesses 632, 642, 652 and 662, respectively, each about 0.5 cm. FIG. 6C depicts tracks of *Drosophilae melanogaster* in the presence of an optical barrier for flies with genetic modifications that compromise high heat sensors (also called pain sensors herein). FIG. 6D depicts tracks of *Drosophilae melanogaster* in the presence of an optical barrier for flies with genetic mutations that cause blindness. FIG. 6E depicts tracks of *Drosophilae melanogaster* in the presence of an optical barrier for wild flies with no genetic modifications that compromise sensory systems. FIG. 6F depicts tracks of *Drosophilae melanogaster* in the presence of an optical barrier for flies with genetic modifications that compromise dorsal ocelli. The dorsal ocelli are light-sensitive organs found on the top-most surface or frontal surface of the head of many insects and co-exist with compound eyes, an anatomically separate and functionally different visual sensor.

An overwhelming majority of the wild and altered flies were stopped by the optical barrier for all experiments. Those flies that do cross the optical barrier mostly cross the barrier by walking towards the left, i.e. away from the generator 274 from which the light enters on the right of the figures. Thus the crossing flies appeared to rely on the technique of turning their backs towards the source of the light wall and climbing almost towards the side. While only a few percent of wild-type, painless and blind genotypes of *Drosophilae melanogaster* crossed the optical barrier 276, the fly genotype with the partial loss of its ocelli gene (FIG. 6F) crossed the optical barrier at a much higher percentage, but still only about 15% crossing and still moving away from the generator 274.

Out of those fruit flies that entered the optical barrier, only about 2% for the wild type and heat sensor/pain disabled genotypes made it all the way through. The blind type showed slightly less susceptibility, with about 5% of these flies traversing all the way through the optical barrier. A significant effect is determined for the genotype where the genetic code responsible for the ocelli (noc) was modified such that the flies' ocelli were not functioning. In this case, about 15% of the flies traversed through the optical barrier. In fact, ocelli are generally considered far more sensitive to light than the compound eye.

These results imply that the lack of ocelli significantly decreases the fly's ability to recognize the optical barrier and turn back from it, while the lack of other sensory organs seems to be less influential. However, the still relatively low crossing ratio for the compromised ocelli genotype (only 15% traverse the optical barrier) also indicates that the effect of the optical barrier is a result of a complex interaction of multiple sensors, as well as the neural connections of the *Drosophilae melanogaster*. The same complexity is expected to be present in the *Anopheles gambiae* system. Furthermore, it is noted that the *Anopheles gambiae* have extremely sensitive heat sensors, mostly on their antennae, which might also be important in sensing the optical barrier.

The fact that *Drosophilae melanogaster* tend to turn away from the source of the light while crossing the optical barrier has several possible explanations, such as an attempt to protect the ocelli from a bright NIR source, or to keep a straight course when navigating by sunlight. The latter phenomenon, called dorsal light response, might contribute to the observed behavior. However, because flies entering the optical barrier mostly turn back, indicating that the presence of the optical waveform is detected as unpleasant or dangerous, effects other than dorsal light response are likely to be responsible for the turning back of the flies.

Table 1. Summarizes several experiments performed with optical barriers.

TABLE 1

Summary of experimental embodiments.

| Pest | wavelength (nm) | Power (W cm$^{-2}$) | Reaction time (ms) | Beam width (cm) | Repulsion observed |
|---|---|---|---|---|---|
| Anopheles gambiae (wild type, G3) | 808 | <4 | 100 | 2 | >90% |
|  | 1550 | 1.2-3 | 2000-3000 | NA | NA |
|  | 1350 | 1.7 | 500-1500 | NA | NA |
| Drosophila melanogaster (wild type) | 808 | <4 | NA | 0.5 | >95% |
| Wasp (wild type) | 1064 | 1 | NA | NA | lost flying ability |

Other Embodiments

In various embodiments, the optical barrier can cause short or long term effects, or both, upon animals approaching, entering or crossing it. Short or long term effects are desired or achievable depending on the application. For example, for defending humans from arthropods, it can be sufficient to only distract the arthropods enough so they do not attack humans. One can also attempt to permanently damage the arthropods, therefore decreasing their number in nature, but such a purpose may be infeasible in consideration of power consumption and human safety.

Since the proposed device has no direct negative effect on the environment, it can offer a preferable solution over other means in certain applications. For example, traditional ways of keeping mosquitoes away from humans include different chemicals used to coat mosquito nets or on other surfaces and can be dangerous to the environment, animals and/or humans.

In some embodiments, an optical barrier has practical advantages over other methods or devices used. For example, in the case of mosquito control, other tools can be misused. For example, mosquito nets can be taken from children by adults who are less affected by malaria, or the nets can be used for fishing, which is not just inappropriate but also harmful to the environment by catching even very small water animals. The optical barrier generator has no such misuse. Furthermore, an optical barrier generator can be used both indoor and outdoor, and under different environmental conditions such as temperature or wind, that is harder to achieve with other means. Operating the device is easy and requires little maintenance; such low maintenance is rare among other means of defense.

In various embodiments, the light barrier is used on its own, or combined with other means to increase effect. For example, in some embodiments for mosquito prevention, the optical barrier is combined with attractors such as carbon dioxide (CO2), odors (sweat) or other chemical attractors, heat source, or living pray (e.g. cattle, mice, etc.) to attract mosquitoes and then distract, damage or kill them.

It is possible that, when the light barrier perturbs one or more animals, others not directly affected by the barrier will change their behavior (e.g. motion) due to the affected animals. For example, if some mosquitoes are repelled or attracted from or to some place, others might follow them, therefore behaving collectively in a manner that can amplify the effect of the device. Animals might also learn the locations of barriers and intentionally avoid them in the future, which can also increase the usefulness of the device.

So far, the properties and possible effects of a barrier to animals trying to cross, enter or approach it have been described. Another possible use is clearing a volume, e.g. when a given volume that might already contain some of the animals is 'cleared' by scanning through it using the optical barrier. For example, if it is assumed that arthropods are present in a given volume, it is desirable to disturb, damage or kill them. This can be achieved by scanning through the volume with a light source (moving barrier) from which the arthropods flee or cannot or can hardly escape. Another possible application is when one needs to enter a clean room through a two door entrance. If it is desired to clean the volume between the two doors while the person is in there so particles coming in when the first door was opened cannot enter the second door, an optical barrier can be used to sweep the particles without harming the person.

One embodiment of the device is to be used in the third world where malaria is epidemic. It other embodiments, however, an optical barrier is used in developed countries and military operations as well in order to keep insects away from humans, animals, houses, tents, etc. Dangerous arthropods other than mosquitoes (e.g. kissing bug) also expected to be repelled or damaged by embodiments of the proposed device.

In some embodiments, small objects or particles change their velocity (magnitude and/or direction) while approaching or crossing the barrier, due to thermal or density changes in the air, inducing air movement. Small objects or particles can be (i) molecules in gas state, (ii) mist of different liquids, (iii) pollen or (iv) small objects such as dust, pollen or other particulates. This effect could be used, e.g., to keep a given volume clean of these small objects by creating a barrier keeping them away, or guiding the particles to a given volume and collecting them there.

In some embodiments, small objects or particles change their density or composition due to the barrier. For example a high enough light intensity can make drops of liquids floating in the air evaporate, or burn dust or pollen particles so they change their chemical composition.

In some embodiments, the light barrier affects other living creatures. Bacteria, or viruses floating in the air could be kept away from or guided into a given volume, or affected such that they cannot contaminate or multiply any longer. For example, they can be affected similarly to small objects or particles as described above.

In some embodiments, plants or fungi change their direction or growth in the proximity of the optical barrier. For high enough intensity in the barrier, some plants or fungi avoid growing through the barrier, or the parts of them approaching the barrier are caused to stop growing.

In some embodiments, the barrier is deployed in other media besides air. The barrier can be used similarly in other types of gas media, liquids, or vacuum.

In some embodiments the barrier is deployed with one or more visible wavelengths, such as white light, to indicate to humans that the device is working. Such embodiments have synergistic effects in underdeveloped countries, where electrical lights are scarce, e.g., by providing visible light for social or educational purposes while perturbing one or more pests.

FIG. 7 illustrates a computer system 700 upon which a portion of an embodiment to control components of a generator, e.g., controller 118, may be implemented. Computer system 700 includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a transmission medium such as a cable or carrier wave, or any other medium from which a computer can read. Information read by a computer from computer-readable media are variations in physical expression of a measurable phenomenon on the computer readable medium. Computer-readable storage medium is a subset of computer-readable medium which excludes transmission media that carry transient man-made signals.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server host 792 connected to the Internet hosts a process that provides a service in response to information received over the Internet. For example, server host 792 hosts a process that provides information representing video data for presentation at display 714.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set 800 upon which an embodiment of the invention may be implemented. Chip set 800 is programmed to carry out the inventive functions described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-word signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein.

The memory 805 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising an optical barrier generator configured to emit light of an optical waveform above a threshold power in a portion of space positioned relative to the generator, wherein
    the optical waveform above the threshold power is effective at perturbing a pest to human activity so that the pest is unlikely to cross the portion of space along an axis through the portion of space; and
    the optical barrier generator comprises an optical shaping component configured to shape the portion of space such that the axis has a spatial extent in a range based on a product of a time for the pest to change direction in response to a wavelength in the optical waveform and a travel speed of the pest.

2. An apparatus of claim 1, wherein the portion of space is a sheet that extends at least twice as far in each perpendicular dimension as along the axis.

3. An apparatus of claim 1, wherein the optical waveform includes a wavelength in the near infrared portion of the optical spectrum.

4. An apparatus of claim 1, wherein the optical waveform includes a human-safe visible wavelength at low power to indicate the location of the portion of space.

5. An apparatus of claim 1, wherein the optical waveform includes a wavelength of about 800 nanometers.

6. An apparatus of claim 5, wherein the portion of space is in a range from about 0.5 centimeters to about four centimeters along the axis.

7. An apparatus of claim 1, wherein the threshold power is about one Watt per square centimeter.

8. An apparatus of claim 1, wherein the optical waveform includes a wavelength of about 1550 nanometers.

9. An apparatus of claim 8, wherein the portion of space is in a range from about 10 centimeters to about eighty centimeters along the axis.

10. An apparatus of claim 1, wherein the optical waveform comprises a scanning laser beam.

11. An apparatus of claim 1, wherein the optical barrier generator is further configured to emit in the portion of space light of the optical waveform above the threshold power and below a maximum power.

12. An apparatus of claim 11, wherein the maximum power is a power level that is safe for humans.

13. An apparatus of claim 1, wherein the optical waveform above the threshold power is configured to cause the pest to be less than 5% likely to cross the portion of space.

14. An apparatus of claim 1, wherein the optical barrier generator further comprises a sensor to detect operational performance of one or more optical components and a controller to operate the optical barrier generator based on data from the sensor.

15. An apparatus of claim 1, wherein the apparatus further comprises a sensor to detect one or more environmental conditions and a controller to operate the optical barrier generator based on data from the sensor.

16. A method comprising operating an optical barrier generator to illuminate a portion of space with light of an optical waveform above a threshold power, wherein the optical waveform above the threshold power is effective at perturbing a pest to human activity so that the pest is unlikely to cross the portion of space along an axis through the portion of space, and the axis has a spatial extent in a range based on a product of a time for the pest to change direction in response to a wavelength in the optical waveform and a travel speed of the pest.

17. A method of claim 16, wherein the portion of space is a sheet that extends at least twice as far in each perpendicular dimension as along the axis.

18. A method of claim 16, wherein the optical waveform includes a wavelength in the near infrared portion of the optical spectrum.

19. A method of claim 16, wherein the optical waveform includes a human-safe visible wavelength at low power to indicate the location of the portion of space.

20. A method of claim 16, wherein the optical waveform includes a wavelength of about 800 nanometers.

21. A method of claim 20, wherein the portion of space is in a range from about 0.5 centimeters to about four centimeters along the axis.

22. A method of claim 16, wherein the threshold power is about one Watt per square centimeter.

23. A method of claim 16, wherein the optical waveform includes a wavelength of about 1550 nanometers.

24. A method of claim 23, wherein the portion of space is in a range from about 10 centimeters to about eighty centimeters along the axis.

25. A method of claim 16, wherein the optical waveform comprises a scanning laser beam.

26. A method of claim 16, wherein illuminating the portion of space with light of the optical waveform above a threshold power further comprises illuminating the portion of space below a maximum power.

27. A method of claim 26, wherein the maximum power is a power level that is safe for humans.

28. A method of claim 16, wherein the optical waveform above the threshold power causes the pest to be less than 5% likely to cross the portion of space.

29. A method comprising protecting a space from a pest to human activity by blocking all pest entry paths to the space with one or more optical barriers that each cause the pest to be unlikely to cross the optical barrier along an axis through the optical barrier, wherein each optical barrier comprises a portion of space such that the axis has a spatial extent in a range based on a product of a time for the pest to change direction in response to a wavelength in the optical waveform and a travel speed of the pest.

30. A method of claim 29, wherein the space is a volume where human activity occurs.

31. A method of claim 29, wherein the space encompasses a human residence.

32. A method of claim 29, wherein the space encompasses a man-made facility.

33. A method of claim 29, wherein the space encompasses a field of crops.

34. A method of claim 29, wherein the space encompasses a mine.

35. A method of claim 29, wherein the space encompasses a vehicle.

36. An apparatus of claim 1, wherein the pest is a mosquito capable of carrying a malaria parasite.

37. A method of claim 16, wherein the pest is a mosquito capable of carrying a malaria parasite.

38. A method of claim 29, wherein the pest is a mosquito capable of carrying a malaria parasite.

\* \* \* \* \*